US012521133B2

(12) United States Patent
Kocur

(10) Patent No.: US 12,521,133 B2
(45) Date of Patent: Jan. 13, 2026

(54) CUTTING AND SCORING LITHOTRIPSY BALLOON CATHETER

(71) Applicant: BOSTON SCIENTIFIC SCIMED, INC., Maple Grove, MN (US)

(72) Inventor: Gordon John Kocur, Lino Lakes, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 159 days.

(21) Appl. No.: 18/220,051

(22) Filed: Jul. 10, 2023

(65) Prior Publication Data

US 2024/0016508 A1 Jan. 18, 2024

Related U.S. Application Data

(60) Provisional application No. 63/388,474, filed on Jul. 12, 2022.

(51) Int. Cl.
*A61B 17/22* (2006.01)
*A61B 17/3207* (2006.01)

(52) U.S. Cl.
CPC .. *A61B 17/2202* (2013.01); *A61B 17/320725* (2013.01); *A61B 2017/22067* (2013.01)

(58) Field of Classification Search
CPC ........ A61B 17/2202; A61B 17/320725; A61B 2017/22067
See application file for complete search history.

(56) References Cited

U.S. PATENT DOCUMENTS

| | | | |
|---|---|---|---|
| 11,103,262 | B2 | 8/2021 | Tran et al. |
| 2011/0160647 | A1 | 6/2011 | Tsukashima et al. |
| 2014/0277002 | A1 | 9/2014 | Grace |
| 2018/0228537 | A1 | 8/2018 | Dong et al. |
| 2019/0282249 | A1 | 9/2019 | Tran et al. |
| 2020/0397230 | A1 | 12/2020 | Massimini et al. |
| 2020/0397453 | A1 | 12/2020 | McGowan et al. |
| 2020/0397461 | A1 | 12/2020 | Massimini et al. |
| 2020/0398033 | A1 | 12/2020 | McGowan et al. |

FOREIGN PATENT DOCUMENTS

| | | | |
|---|---|---|---|
| JP | H05137729 | A | 6/1993 |
| JP | 2019500100 | A | 1/2019 |
| WO | 2017099950 | A1 | 6/2017 |

OTHER PUBLICATIONS

Invitation to Pay Additional Fees dated Oct. 27, 2023 for International Application No. PCT/US2023/027266.

*Primary Examiner* — Ashley L Fishback

(74) *Attorney, Agent, or Firm* — Seager, Tufte & Wickhem, LLP

(57) ABSTRACT

Catheters configured to substantially simultaneously cut or score a lesion and deliver a pressure wave to the lesion. An illustrative catheter may comprise a catheter shaft, an expandable member secured to a distal portion of the catheter shaft, a cutting member secured to the expandable member, and an ultrasound transducer disposed within the expandable member. Tethers may be attached between the expandable member and the emitter that self-orientate the emitter towards target tissue due to uneven expansion of expandable member due to different compliance between target tissue and surrounding tissue.

20 Claims, 9 Drawing Sheets

CUTTING AND SCORING LITHOTRIPSY BALLOON CATHETER

CROSS REFERENCE TO RELATED APPLICATIONS

The present application claims the benefit of and priority to U.S. Provisional Patent Application No. 63/388,474, filed Jul. 12, 2022, the disclosure of which is incorporated herein by reference.

TECHNICAL FIELD

The disclosure pertains to angioplasty balloon catheters having cutting or scoring elements mounted onto an angioplasty balloon with an internal lithotripsy emitter. More particularly, the disclosure is directed to angioplasty balloon for modifying lesion compliance within or near a vascular lumen.

BACKGROUND

Many patients suffer from occluded arteries and other blood vessels which restrict blood flow. Occlusions can be partial occlusions that reduce blood flow through the occluded portion of a blood vessel or total occlusions (e.g., chronic total occlusions) that substantially block blood flow through the occluded blood vessel. Occluded, stenotic, or narrowed blood vessels may be treated with a number of relatively non-invasive medical procedures including percutaneous transluminal angioplasty (PTA), percutaneous transluminal coronary angioplasty (PTCA), atherectomy, and lithotripsy. However, the efficacy of intravascular lithotripsy may be reduced for eccentric calcific lesions. Of the known medical devices, systems, and methods, each has certain advantages and disadvantages. There is an ongoing need to provide alternative medical devices and systems, including devices and systems for treating occlusions or calcified lesions.

SUMMARY

The disclosure is directed to several alternative designs, materials and methods of manufacturing medical device structures and assemblies.

In a first example, a catheter may comprise a catheter shaft, an expandable member secured to a distal portion of the catheter shaft, a cutting member secured to the expandable member, and an ultrasound transducer disposed within the expandable member.

Alternatively or additionally to any of the examples above, in another example, the catheter shaft may include an inner tubular member defining a first lumen and an outer tubular member defining a second lumen.

Alternatively or additionally to any of the examples above, in another example, the inner tubular member may be torqueable.

Alternatively or additionally to any of the examples above, in another example, the outer tubular member may be torqueable.

Alternatively or additionally to any of the examples above, in another example, the expandable member may comprise an inflatable balloon.

Alternatively or additionally to any of the examples above, in another example, the expandable member may comprise an expandable cage.

Alternatively or additionally to any of the examples above, in another example, the ultrasound transducer may be affixed to an outer surface of the inner tubular member.

Alternatively or additionally to any of the examples above, in another example, the catheter may further comprise an emitter shaft.

Alternatively or additionally to any of the examples above, in another example, the ultrasound transducer may be affixed to a distal portion of the emitter shaft.

Alternatively or additionally to any of the examples above, in another example, the emitter shaft may be rotatable relative to the catheter shaft.

Alternatively or additionally to any of the examples above, in another example, the catheter may further comprise a plurality of tethers extending from the emitter shaft to the expandable member.

Alternatively or additionally to any of the examples above, in another example, each tether of the plurality of tethers may comprise a filament.

Alternatively or additionally to any of the examples above, in another example, each tether of the plurality of tethers may comprise a planar sheet of material.

Alternatively or additionally to any of the examples above, in another example, wherein the plurality of tethers may be configured to rotate the emitter shaft about a longitudinal axis of the emitter shaft as the expandable member is expanded.

Alternatively or additionally to any of the examples above, in another example, the cutting member may be configured to score a lesion while the ultrasound transducer delivers acoustic pressure waves to the lesion.

Alternatively or additionally to any of the examples above, in another example, the plurality of tethers may be configured to rotate the emitter shaft to orientate the ultrasound transducer towards a lesion.

Alternatively or additionally to any of the examples above, in another example, the plurality of tethers may be uniformly distributed about a circumference of the emitter shaft.

Alternatively or additionally to any of the examples above, in another example, the plurality of tethers may comprise three tethers.

Alternatively or additionally to any of the examples above, in another example, the ultrasound transducer may be configured to impart a substantially uniform acoustic pressure wave along a length of a lesion.

Alternatively or additionally to any of the examples above, in another example, the expandable member may comprise an expandable basket.

Alternatively or additionally to any of the examples above, in another example, the expandable member may comprise a plurality of longitudinally extending struts.

In another example, a balloon catheter may comprise a catheter shaft, an inflatable balloon secured to a distal portion of the catheter shaft, a cutting member secured to the inflatable balloon, an emitter shaft, and an ultrasound transducer disposed on the emitter shaft and within the inflatable balloon.

Alternatively or additionally to any of the examples above, in another example, the catheter shaft may include an inner tubular member defining a guidewire lumen and an outer tubular member defining an inflation lumen.

Alternatively or additionally to any of the examples above, in another example, the emitter shaft may be disposed within the guidewire lumen.

Alternatively or additionally to any of the examples above, in another example, the emitter shaft may be disposed within the inflation lumen.

Alternatively or additionally to any of the examples above, in another example, the emitter shaft may be rotatable relative to the catheter shaft.

Alternatively or additionally to any of the examples above, in another example, the ultrasound transducer may be configured to impart a substantially uniform acoustic pressure wave along a length of a lesion.

In another example, a catheter may comprise a catheter shaft, an expandable member secured to a distal portion of the catheter shaft, a plurality of cutting members secured to the expandable member, an emitter shaft, an ultrasound transducer disposed on the emitter shaft and within the expandable member, and a plurality of tethers extending from the emitter shaft to the expandable member.

Alternatively or additionally to any of the examples above, in another example, each tether of the plurality of tethers may comprise a filament.

Alternatively or additionally to any of the examples above, in another example, each tether of the plurality of tethers may comprise a planar sheet of material.

Alternatively or additionally to any of the examples above, in another example, the plurality of tethers may be configured to rotate the emitter shaft about a longitudinal axis of the emitter shaft as the expandable member is expanded.

Alternatively or additionally to any of the examples above, in another example, the plurality of tethers may be configured to rotate the emitter shaft to orientate the ultrasound transducer towards a lesion.

Alternatively or additionally to any of the examples above, in another example, the plurality of tethers may be uniformly distributed about a circumference of the emitter shaft.

Alternatively or additionally to any of the examples above, in another example, the plurality of tethers may comprise three tethers.

Alternatively or additionally to any of the examples above, in another example, each tether of the plurality of tethers may be circumferentially offset from the plurality of cutting members.

Alternatively or additionally to any of the examples above, in another example, at least one cutting member of the plurality of cutting members may be configured to score a lesion while the ultrasound transducer delivers acoustic pressure waves to the lesion.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

Figure 1A:
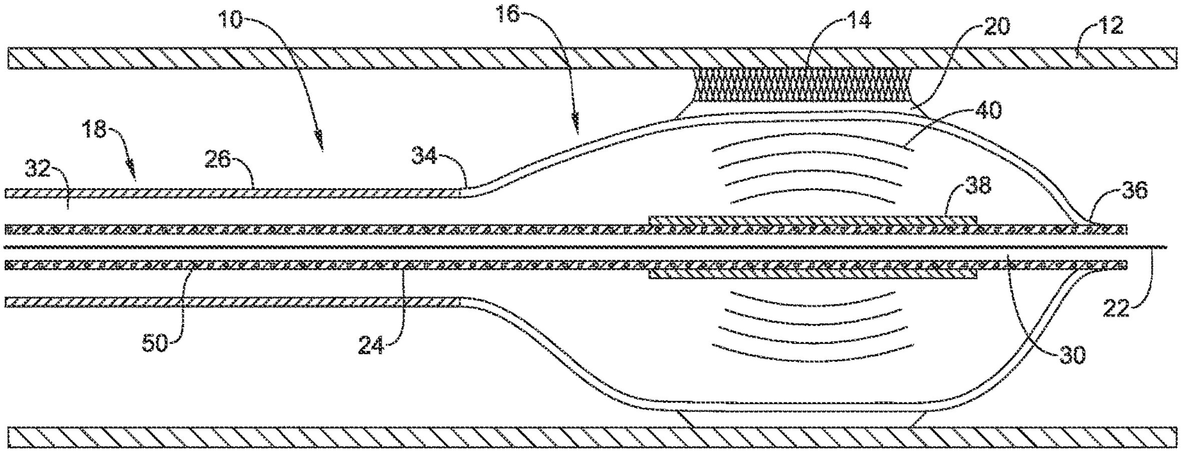
FIG. 1A is a cross-sectional side view of an illustrative balloon catheter with cutting or scoring elements that anchor into the vessel wall and a lithotripsy emitter disposed in a blood vessel.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Many patients suffer from occluded arteries, other blood vessels, and/or occluded ducts or other body lumens which may restrict bodily fluid (e.g., blood, bile, etc.) flow. Occlusions can be partial occlusions that reduce blood flow through the occluded portion of a blood vessel or total occlusions (e.g., chronic total occlusions) that substantially block blood flow through the occluded blood vessel. Revascularization techniques include using a variety of devices to pass through the occlusion to create or enlarge an opening through the occlusion. In some cases, lesions such as calcified lesions may create problems for revascularization techniques, and it may be beneficial to treat the calcified lesions in order to modify their compliance enabling full dilation before stenting.

In some cases, for example, ultrasound may be used to treat vascular lesions, such as fibrotic and calcified lesions, at various states of disease progression, ranging from soft plaques to severely calcified lesions. Vascular lesions that may lend themselves to being treated with ultrasound-based devices include irregular, severely calcified plaques that are located within and adjacent to vessel walls, and lesions that are more or less rigid and thus may be susceptible to being mechanically fatigued to failure. For example, sound-based devices may be used to produce standing wave pressure patterns within the thickness of the lesion, bending moments at the ends of the lesion, and/or resonance along the length of the lesion. In some cases, the high frequency mechanical action of ultrasound may also be effective in treating earlier state vascular lesions, including fibrotic and soft plaques. In some cases, an ultrasound device may apply a treatment of unfocused, near-field ultrasound waves to treat vascular lesions. However, the efficacy of ultrasound treatment for eccentric calcific lesions may be reduced compared to a lesion that extents about an entire circumference of the vessel. For example, the ultrasound waves or shock waves may be emitted from an ultrasound transducer approximately 180° opposite from one another. If the emitted shockwave does not align with the lesion, the shockwave may not disrupt or modify the lesion. The user may have no or little control over the circumferential orientation of the emitter. It may be desirable to provide devices or systems that self-orientate the emitter towards the calcified lesion. While the devices or systems described herein are described with respect to vascular lesions, it should be understood that the devices or systems may be used in other applications, such as, but not limited to, peripheral calcified lesions, aortic valves, mitral valves, or non-vascular applications including the treatment of tumors. For example, the methods and systems described herein may be used in any conduit that requires aiming or directing the emitter. The conduit may include differences in compliance due to lesions, tumors, etc. It is contemplated that the devices and systems described herein may orientate the emitter towards the peripheral lesion or the tumor and away from adjacent organs.

FIG. 1A is a partial cross-sectional side view of an illustrative catheter 10 that may be used to treat a lesion disposed in a blood vessel 12 and positioned adjacent an intravascular lesion 14. The catheter 10 may be configured to cut or score the lesion 14 as well as emit a shockwave or ultrasound field. It is contemplated that a combination of ultrasound energy and cutting or scoring elements may cover a broader circumferential area than either alone. This may improve the efficacy of treatment, particularly in lesions having a low circumferential angle of calcification (e.g., the lesion extends less than an entire circumference of the vessel 12).

Figure 1B:
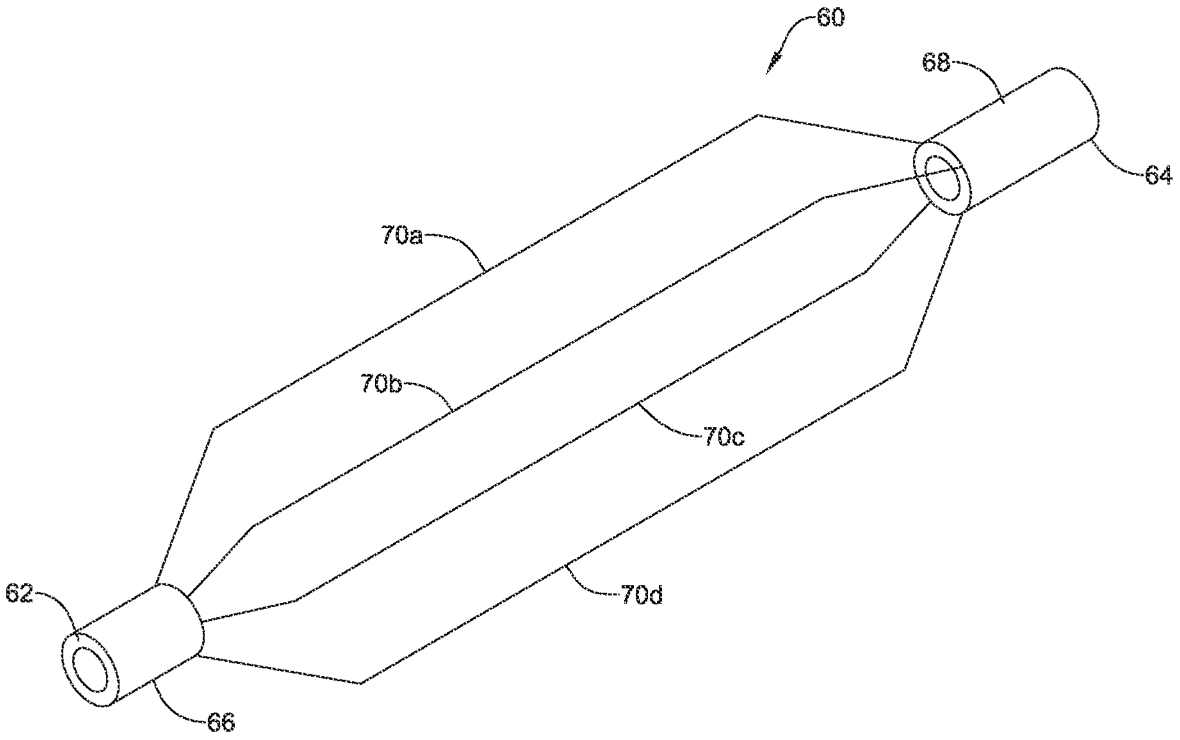
FIG. 1B is a perspective view of an illustrative scoring cage that may be used with the balloon catheter of FIG. 1A.

The catheter 10 may include a balloon 16 coupled to a catheter shaft 18. One or more cutting members or blades 20 may be mounted on or over the balloon 16. The cutting members 20 may be cutting blades, as shown in FIG. 1A or scoring members, as shown in FIG. 1B. In general, the catheter 10 may be advanced over a guidewire 22, through the vasculature, to a target area with the balloon 16 in a collapsed or deflated configuration. Once positioned at the target location in the vasculature, the balloon 16 can be inflated to exert a radially outward force on the lesion 14 and the cutting members 20 may engage the lesion 14. Thus, the cutting members 20 may cut or score the lesion 14 to facilitate enlarging the lumen proximate the lesion 14. The target area may be within any suitable peripheral or cardiac vessel lumen location.

The cutting members 20 may vary in number, position, and arrangement about the balloon 16. For example, the catheter 10 may include one, two, three, four, five, six, or more cutting or scoring members 20 that are disposed at any position along the balloon 16 and in a regular, irregular, or any other suitable pattern. For example, in some embodiments, the balloon 16 may include a plurality of cutting members 20 extending longitudinally along a length of the balloon 16 and arranged symmetrically around the circumference of the balloon 16. This is just one example.

The cutting members 20 may be made from any suitable material such as a metal, metal alloy, polymer, metal-polymer composite, and the like, or any other suitable material. For example, the cutting members 20 may be made from stainless steel, titanium, nickel-titanium alloys, tantalum, iron-cobalt-nickel alloys, or other metallic materials in some instances.

The balloon 16 may be made from typical angioplasty balloon materials including polymers such as polyethylene terephthalate (PET), polytetrafluoroethylene (PTFE), ethylene tetrafluoroethylene (ETFE), polybutylene terephthalate (PBT), polyurethane, polyvinylchloride (PVC), polyether-ester, polyester, polyamide, elastomeric polyamides, polyether block amide (PEBA), as well as other suitable materials, or mixtures, combinations, copolymers thereof, polymer/metal composites, and the like.

The balloon 16 may be configured so that the balloon 16 includes one or more "wings" or wing-shaped regions when the balloon 16 is deflated. In some instances, the wings may be configured so that the cutting members 20 can be positioned at the inward-most positions of the deflated balloon 16, with the cutting members 20 enfolded under the wings of the balloon 16. This arrangement may reduce the exposure of the cutting members to the blood vessel during delivery of the balloon 16 to the lesion 14. Other configurations may be used, as desired.

The shaft 18 may be a catheter shaft, similar to typical catheter shafts. For example, the catheter shaft 18 may include an outer tubular member 26 and an inner tubular member 24 extending through at least a portion of the outer tubular member 26. The inner and outer tubular members 24, 26 may be manufactured from a number of different materials. For example, the inner and outer tubular members 24, 26 may be made of metals, metal alloys, polymers, metal-polymer composites or any other suitable materials.

The inner and outer tubular members 24, 26 may be arranged in any appropriate way. For example, in some embodiments, the inner tubular member 24 can be disposed coaxially within the outer tubular member 26. According to these embodiments, the inner and outer tubular members 24, 26 may or may not be secured to one another along the general longitudinal axis of the catheter shaft 18. Alternatively, the inner tubular member 24 may follow the inner wall or otherwise be disposed adjacent the inner wall of the outer tubular member 26. In other embodiments, the inner and outer tubular members 24, 26 may be arranged in another desired fashion. In some embodiments, the inner tubular member 24 may be torqueable and rotate independent of the outer tubular member 26 to rotate the lithotripsy emitter or ultrasound transducer 38. For example, the inner tubular member 24 may include an embedded reinforcing member 50. For example, the inner tubular member 24 may include an embedded coil or braided member. Alternatively, or additionally, the outer tubular member 26 may be torqueable (e.g., include an embedded braid or coil reinforcing member) to facilitate rotating the entire device 10 in the vasculature before or between inflations.

The inner tubular member 24 may include an inner lumen 30. In at least some embodiments, the inner lumen 30 is a guidewire lumen for receiving the guidewire 22 therethrough. Accordingly, the catheter 10 can be advanced over the guidewire 22 to the desired location. The guidewire lumen 30 may extend along essentially the entire length of the catheter shaft 18 such that catheter 10 resembles traditional "over-the-wire" catheters. Alternatively, the guidewire lumen 30 may extend along only a portion of the catheter shaft 18 such that the catheter 10 resembles "single-operator-exchange" or "rapid-exchange" catheters.

The catheter shaft 18 may also include an inflation lumen 32 that may be used, for example, to transport inflation media to and from the balloon 16 to selectively inflate and/or deflate the balloon 16. The location and position of the inflation lumen 32 may vary, depending on the configuration of the inner and outer tubular members 24, 26. For example, when the outer tubular member 26 surrounds the inner tubular member 24, the inflation lumen 32 may be defined within the space between the outer tubular member 26 and the inner tubular member 24. In embodiments in which the outer tubular member 26 is disposed alongside the inner tubular member 24, then the inflation lumen 32 may be the lumen of the outer tubular member 26.

The balloon 16 may be coupled to the catheter shaft 18 in any of a number of suitable ways. For example, the balloon 16 may be adhesively or thermally bonded to the catheter shaft 18. In some embodiments, a proximal waist 34 of the balloon 16 may be bonded to the catheter shaft 18, for example, bonded to the distal end of the outer tubular member 26, and a distal waist 36 of the balloon 16 may be bonded to the catheter shaft 18, for example, bonded to the distal end of the inner tubular member 24. The exact bonding positions, however, may vary.

The inner tubular member 24 may include an ultrasound transducer or emitter 38. The ultrasound transducer 38 may be coupled to an outer surface of the inner tubular member 24 adjacent a distal portion thereof such that the ultrasound transducer is disposed within the balloon 16. In some cases, the ultrasound transducer 38 may include a piezoelectric material, which transmits acoustic pressure in response to an applied voltage. The ultrasound transducer 38 may be driven at one or more frequencies in the range of about 20 kilohertz (kHz) to about 50 megahertz (MHz). The ultrasound transducer 38 may be a single ultrasound transducer, or the ultrasound transducer 38 may include a series of ultrasound transducers that may be operated to effectively function as a single ultrasound transducer, providing the desired acoustic pressure over the desired treatment area. The acoustic pressure applied may range from tens of kiloPascals (kPa) to in excess of ten megaPascals (MPa).

The ultrasound transducer 38 may produce an ultrasound field 40 that includes a near field region and a far field region. In the near field region, dynamic acoustic pressures may be cyclically applied to the calcified lesion 14. As used herein, the near field region refers to a region in close proximity radially to a surface of the ultrasound transducer 38, for example, the region extending outward from the transducer surface to a radial distance less than or equal to a length of the ultrasound transducer 38, wherein the acoustic pressure waves transmitted by the ultrasound transducer 38 are unfocused and can be controlled to be substantially uniform upon the calcified lesion 14. The ultrasound transducer 38 may be configured to emit ultrasound waves in two opposing directions, or about 180° apart.

In some cases, for example, the ultrasound transducer 38 may be configured to impart a uniform or substantially uniform acoustic pressure along the length of the calcified lesion 14. In cardiac vessel disease states, vascular lesions may span a length of about 10 millimeters (mm) to about 25 mm in vessels that are about 2 mm to about 4 mm in diameter. In peripheral vessel disease states, vascular lesions may span a length of up to about 200 mm in vessels up to about 12 mm in diameter. Depending on the therapeutic applications, the ultrasound transducer 38 may be configured to impart a uniform or substantially uniform acoustic pressure over a length of about 10 mm to about 60 mm at a radial distance of about 1 mm to about 8 mm as measured from a central axis extending through the catheter shaft 18. While not explicitly shown, multiple ultrasound transducers 38 may be used and configured to extend the effective therapeutic length, such as up to a length of about 200 mm.

To impart a uniform or substantially uniform acoustic pressure in the near field, the ultrasound transducer 38 may have a length that is multiple times larger than a diameter of the inner tubular member 24 and/or the outer tubular member 26. In some cases, the ultrasound transducer 38 may have a length that is at least as long as a length of the calcified lesion 14, to generate a uniform or substantially uniform acoustic pressure over a length of about 20 to about 80 mm. In some instances, the ultrasound transducer 38, may be a single ultrasound transducer or a series of ultrasound transducers or transducer elements driven in such a way as to effectively act as a single ultrasound transducer. While not explicitly shown, the ultrasound transducer 38 may be electrically coupled to an electronic source via one or more wires. In some cases, two or more ultrasound transducers may be coupled to a single electronic source and driven with the same frequency and output. In other embodiments, two or more ultrasound transducers may be coupled to two or more differing electronic sources and driven independently of one another so that amplitude and phase control may be applied to increase the uniformity of the acoustic pressure imparted to the lesion 14.

The balloon 16 may be inflated using any suitable inflation fluid. Example inflation fluid may include, but is not limited to, water, saline (e.g., 0.9% sodium chloride), a mixture of saline and a radiopaque contrast agent (e.g., a 50/50 mixture), etc. In some cases, the inflation fluid may be chosen for how acoustic energy transmits through the inflation fluid. It will be appreciated that by selecting a particular fluid with which to inflate the balloon 16, one is able to control the efficiency of acoustic energy transmission through the fluid and to the calcified lesion 14. In one example, the inflation fluid may be chosen to have a specific characteristic acoustic impedance to serve as an acoustic matching between the ultrasound transducer 38 and the vessel wall 12. In another example, the inflation fluid may be chosen to have a specific characteristic acoustic impedance to serve as an acoustic matching to minimize transmission loss across a wall of the inflatable balloon 16. In another example, the inflation fluid may be chosen to have a specific sound velocity in order to modify the near field behavior of the ultrasound transducer 38.

FIG. 1B is a perspective view of an illustrative scoring cage 60 that may be used in place of in addition to the cutting members 20 shown and described in FIG. 1A. The scoring cage 60 may extend from a first or proximal end 62 to a second or distal end 64. The proximal end 62 may include a proximal collar or proximal tubular member 66. The proximal collar 66 may be configured to be disposed over the outer tubular member 26 adjacent to or proximal to the proximal waist 34 of the balloon 16. In some cases, the proximal collar 66 may be secured to the outer surface of the outer tubular member 26. In other embodiments, the proximal collar 66 may be slidably disposed over the outer tubular member 26. The distal end 64 may include a distal collar or distal tubular member 68. The distal collar 68 may be configured to be disposed over the inner tubular member 24 adjacent to or distal to the distal waist 36 of the balloon 16. In some cases, the distal collar 68 may be secured to the outer surface of the inner tubular member 24. The scoring cage 60 may further include one or more longitudinally extending wires 70*a*, 70*b*, 70*c*, 70*d* (collectively, extending between the proximal collar 66 and the distal collar 68. The longitudinally extending wires 70 may be positioned along an outer surface of the balloon 16. As the balloon 16 is expanded, the wires 70 may be pushed into a lesion 14 to score the lesion 14. While the scoring cage 60 is illustrated as including four wires 70, the scoring cage 60 may include fewer than four or more than four wires 70 as desired. Further, the wires 70 may be uniformly or eccentrically spaced about a circumference of the balloon 16, as desired.

Figure 2:
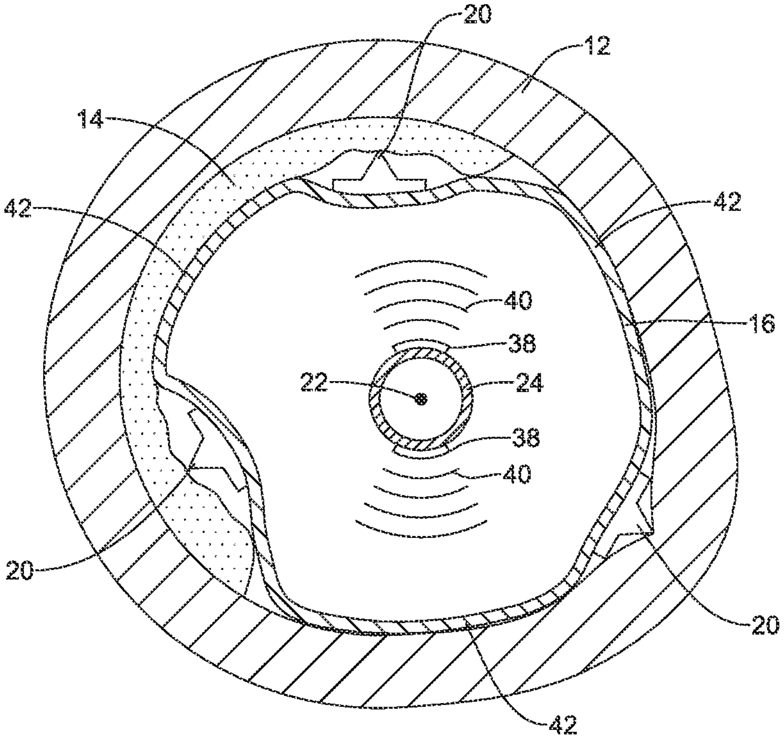
FIG. 2 is a transverse cross-sectional view of the illustrative balloon catheter of FIG. 1A disposed in a blood vessel with an eccentric calcified lesion.

Referring additionally to FIG. 2, which illustrates a transverse cross-sectional view of the balloon 16, as the balloon 16 is expanded at the target region (e.g., adjacent to the lesion 14), the cutting members 20 deliver an amplified force to the lesion 14 generated by the balloon pressure to create controlled longitudinal cracks in the lesion 14. In some cases, the anchored cutting members 20 may supplement force at the point 42 of balloon contact, which may be needed to propagate the fractures at lower pressures while reducing vessel trauma. In addition to the cutting members 20 penetrating the lesion 14, the ultrasound transducer 38 may be activated to generate an ultrasound field 40. It is contemplated that the ultrasound transducer 38 may be positioned such that the ultrasound field 40 aligns with the force amplification zones of the cutting members 20 and balloon 16 (e.g., the cutting members 20 and/or the point of balloon contact 42) to combine and focus two energy modalities on the same spot. For example, during assembly, the ultrasound transducer 38 may be positioned on the inner tubular member 24 to align the generated ultrasound field 40 with at least one cutting member 20. When a lesion 14 is asymmetrical or extends around less than an entire circumference of the vessel 12, the portion of the vessel 12 that is free from the lesion 14 may be more compliant or may stretch more in response to the expansion of the balloon. It is contemplated that the anchoring effect of the cutting members 20 may also stabilize the compliant side of the vessel 12 which in turn may increase the effectiveness of the ultrasound field 40.

Figure 3:
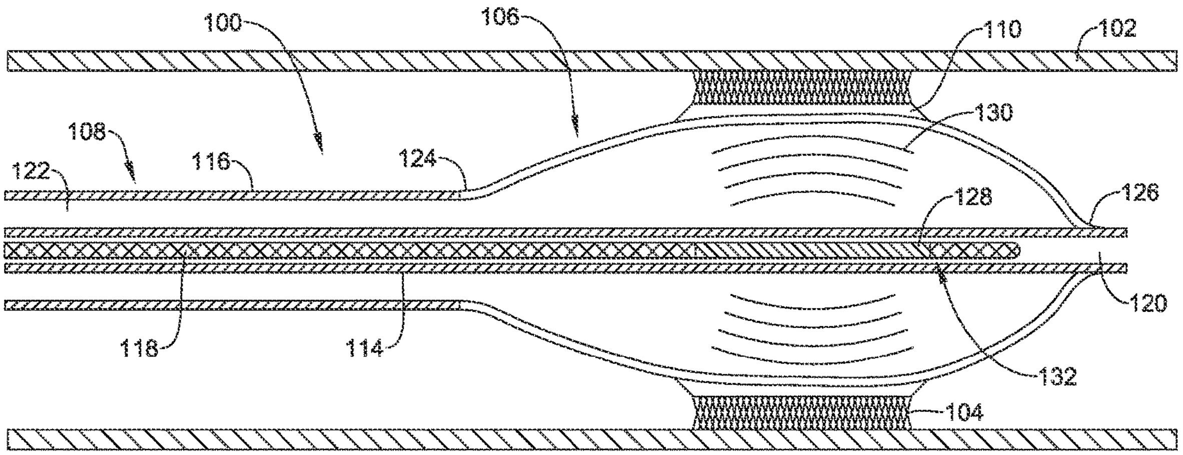
FIG. 3 is a cross-sectional side view of another illustrative balloon catheter disposed in a blood vessel at a 90-degree circumferential orientation relative to FIG. 1.

FIG. 3 is a partial cross-sectional side view of another illustrative catheter 100 that may be used to treat a lesion disposed in a blood vessel 102 and positioned adjacent an intravascular lesion 104. The catheter 100 may be configured to cut or score the lesion 104 as well as emit a shockwave or ultrasound field. It is contemplated that a combination of ultrasound energy and cutting or scoring elements may cover a broader circumferential area than either alone. This may improve the efficacy of treatment, particularly in lesions having a low circumferential angle of calcification (e.g., the lesion extends less than an entire circumference of the vessel 102).

The catheter 100 may include a balloon 106 coupled to a catheter shaft 108. One or more cutting members or blades 110 may be mounted on the balloon 106. The cutting members 110 may be cutting blades or scoring members. In general, the catheter 100 may be advanced over a guidewire 112, through the vasculature, to a target area with the balloon 106 in a collapsed or deflated configuration. Once positioned at the target location in the vasculature, the balloon 106 can be inflated to exert a radially outward force on the lesion 104 and the cutting members 110 may engage the lesion 104. Thus, the cutting members 110 may cut or score the lesion 104 to facilitate enlarging the lumen proximate the lesion 104. The target area may be within any suitable peripheral or cardiac vessel lumen location.

The cutting members 110 may vary in number, position, and arrangement about the balloon 106. For example, the catheter 100 may include one, two, three, four, five, six, or more cutting members 110 that are disposed at any position along the balloon 106 and in a regular, irregular, or any other suitable pattern. For example, in some embodiments, the balloon 106 may include a plurality of cutting members 110 extending longitudinally along a length of the balloon 106 and arranged symmetrically around the circumference of the balloon 106. This is just one example.

The cutting members 110 may be made from any suitable material such as a metal, metal alloy, polymer, metal-polymer composite, and the like, or any other suitable material. For example, the cutting members 110 may be made from stainless steel, titanium, nickel-titanium alloys, tantalum, iron-cobalt-nickel alloys, or other metallic materials in some instances.

The balloon 106 may be made from typical angioplasty balloon materials including polymers such as polyethylene terephthalate (PET), polytetrafluoroethylene (PTFE), ethylene tetrafluoroethylene (ETFE), polybutylene terephthalate (PBT), polyurethane, polyvinylchloride (PVC), polyether-ester, polyester, polyamide, elastomeric polyamides, polyether block amide (PEBA), as well as other suitable materials, or mixtures, combinations, copolymers thereof, polymer/metal composites, and the like.

The balloon 106 may be configured so that the balloon 106 includes one or more "wings" or wing-shaped regions when the balloon 106 is deflated. In some instances, the wings may be configured so that the cutting members 110 can be positioned at the inward-most positions of the deflated balloon 106, with the cutting members 110 enfolded under the wings of the balloon 106. This arrangement may reduce the exposure of the cutting members 110 to the blood vessel during delivery of the balloon 106 to the lesion 104. Other configurations may be used, as desired.

The shaft 108 may be a catheter shaft, similar to typical catheter shafts. For example, the catheter shaft 108 may include an outer tubular member 116 and an inner tubular member 114 extending through at least a portion of the outer tubular member 116. The inner and outer tubular members 114, 116 may be manufactured from a number of different materials. For example, the inner and outer tubular members 114, 116 may be made of metals, metal alloys, polymers, metal-polymer composites or any other suitable materials.

The inner and outer tubular members 114, 116 may be arranged in any appropriate way. For example, in some embodiments, the inner tubular member 114 can be disposed coaxially within the outer tubular member 116. According to these embodiments, the inner and outer tubular members 114, 116 may or may not be secured to one another along the general longitudinal axis of the catheter shaft 108. Alternatively, the inner tubular member 114 may follow the inner wall or otherwise be disposed adjacent the inner wall of the outer tubular member 116. In other embodiments, the inner and outer tubular members 114, 116 may be arranged in another desired fashion.

The inner tubular member 114 may include an inner lumen 120. In at least some embodiments, the inner lumen 120 is a guidewire lumen for receiving a guidewire (not explicitly shown) therethrough. Accordingly, the catheter 100 can be advanced over the guidewire to the desired location. The guidewire lumen 120 may extend along essentially the entire length of the catheter shaft 108 such that catheter 100 resembles traditional "over-the-wire" catheters. Alternatively, the guidewire lumen 120 may extend along only a portion of the catheter shaft 108 such that the catheter 100 resembles "single-operator-exchange" or "rapid-exchange" catheters.

The catheter shaft 108 may also include an inflation lumen 122 that may be used, for example, to transport inflation media to and from the balloon 106 to selectively inflate and/or deflate the balloon 106. The location and position of the inflation lumen 122 may vary, depending on the configuration of the inner and outer tubular members 114, 116. For example, when the outer tubular member 116 surrounds the inner tubular member 114, the inflation lumen 122 may be defined within the space between the outer tubular member 116 and the inner tubular member 114. In embodiments in which the outer tubular member 116 is disposed alongside the inner tubular member 114, then the inflation lumen 122 may be the lumen of the outer tubular member 116.

The balloon 106 may be coupled to the catheter shaft 108 in any of a number of suitable ways. For example, the balloon 106 may be adhesively or thermally bonded to the catheter shaft 108. In some embodiments, a proximal waist 124 of the balloon 106 may be bonded to the catheter shaft 108, for example, bonded to the distal end of the outer tubular member 116, and a distal waist 126 of the balloon 106 may be bonded to the catheter shaft 108, for example, bonded to the distal end of the inner tubular member 114. The exact bonding positions, however, may vary.

An emitter shaft 118 may be disposed within the guidewire lumen 120. While the emitter shaft 118 is shown in the guidewire lumen 120, the emitter shaft 118 may alternatively be disposed within the inflation lumen 122. The emitter shaft 118 may be manufactured from a number of different materials. For example, the emitter shaft 118 may be made of metals, metal alloys, polymers, metal-polymer composites or any other suitable materials. In some cases, the emitter shaft 118 may be longitudinally translated and/or rotatable within the respective lumen 120, 122. In some embodiments, the emitter shaft 118 may include or be formed from a reinforcing member 119, such as, but not limited to, a coil or braid to enable torqueability.

The emitter shaft 118 may include an ultrasound transducer or emitter 128 positioned adjacent to a distal end region 132 thereof. During a procedure, emitter shaft 118 may be positioned such that the ultrasound transducer 128 is located within the balloon 106 to generally align with the cutting members 110. The ultrasound transducer 128 may be coupled to an outer surface of the emitter shaft 118. In some cases, the ultrasound transducer 128 may include a piezoelectric material, which transmits acoustic pressure in response to an applied voltage. The ultrasound transducer 128 may be driven at one or more frequencies in the range of about 20 kilohertz (kHz) to about 50 megahertz (MHz). The ultrasound transducer 128 may be a single ultrasound transducer, or the ultrasound transducer 128 may include a series of ultrasound transducers that may be operated to effectively function as a single ultrasound transducer, providing the desired acoustic pressure over the desired treatment area. The acoustic pressure applied may range from tens of kiloPascals (kPa) to in excess of ten megaPascals (MPa).

The ultrasound transducer 128 may produce an ultrasound field 130 that includes a near field region and a far field region. In the near field region, dynamic acoustic pressures may be cyclically applied to the calcified lesion 104. As used herein, the near field region refers to a region in close proximity radially to a surface of the ultrasound transducer 128, for example, the region extending outward from the transducer surface to a radial distance less than or equal to a length of the ultrasound transducer 128, wherein the acoustic pressure waves transmitted by the ultrasound transducer 128 are unfocused and can be controlled to be substantially uniform upon the calcified lesion 104. The ultrasound transducer 128 may be configured to emit ultrasound waves in two opposing directions, or about 180° apart.

In some cases, for example, the ultrasound transducer 128 may be configured to impart a uniform or substantially uniform acoustic pressure wave along the length of the calcified lesion 104. In cardiac vessel disease states, vascular lesions may span a length of about 10 millimeters (mm) to about 25 mm in vessels that are about 2 mm to about 4 mm in diameter. In peripheral vessel disease states, vascular lesions may span a length of up to about 200 mm in vessels up to about 12 mm in diameter. Depending on the therapeutic applications, the ultrasound transducer 128 may be configured to impart a uniform or substantially uniform acoustic pressure over a length of about 10 mm to about 60 mm at a radial distance of about 1 mm to about 8 mm as measured from a central axis extending through the catheter shaft 108. While not explicitly shown, multiple ultrasound transducers 128 may be used and configured to extend the effective therapeutic length, such as up to a length of 200 mm.

To impart a uniform or substantially uniform acoustic pressure in the near field, the ultrasound transducer 128 may have a length that is multiple times larger than a diameter of the emitter shaft 118 and/or the outer tubular member 116. In some cases, the ultrasound transducer 128 may have a length that is at least as long as a length of the calcified lesion 104, in some cases, to generate a uniform or substantially uniform acoustic pressure over a length of about 20 to about 80 mm. In some instances, the ultrasound transducer 128, may be a single ultrasound transducer or a series of ultrasound transducers or transducer elements driven in such a way as to effectively act as a single ultrasound transducer. While not explicitly shown, the ultrasound transducer 128 may be electrically coupled to an electronic source via one or more wires. In some cases, two or more ultrasound transducers may be coupled to a single electronic source and driven with the same frequency and output. In other embodiments, two or more ultrasound transducers may be coupled to two or more differing electronic sources and driven independently of one another so that amplitude and phase control may be applied to increase the uniformity of the acoustic pressure imparted to the lesion 104.

The balloon 106 may be inflated using any suitable inflation fluid. Example inflation fluid may include, but is not limited to, water, saline (e.g., 0.9% sodium chloride), a mixture of saline and a radiopaque contrast agent (e.g., a 50/50 mixture), etc. In some cases, the inflation fluid may be chosen for how acoustic energy transmits through the inflation fluid. It will be appreciated that by selecting a particular fluid with which to inflate the balloon 106, one is able to control the efficiency of acoustic energy transmission through the fluid and to the calcified lesion 104. In one example, the inflation fluid may be chosen to have a specific characteristic acoustic impedance to serve as an acoustic matching between the ultrasound transducer 128 and the vessel wall 102. In another example, the inflation fluid may be chosen to have a specific characteristic acoustic impedance to serve as an acoustic matching to minimize transmission loss across a wall of the inflatable balloon 106. In another example, the inflation fluid may be chosen to have a specific sound velocity in order to modify the near field behavior of the ultrasound transducer 128.

Figure 4:
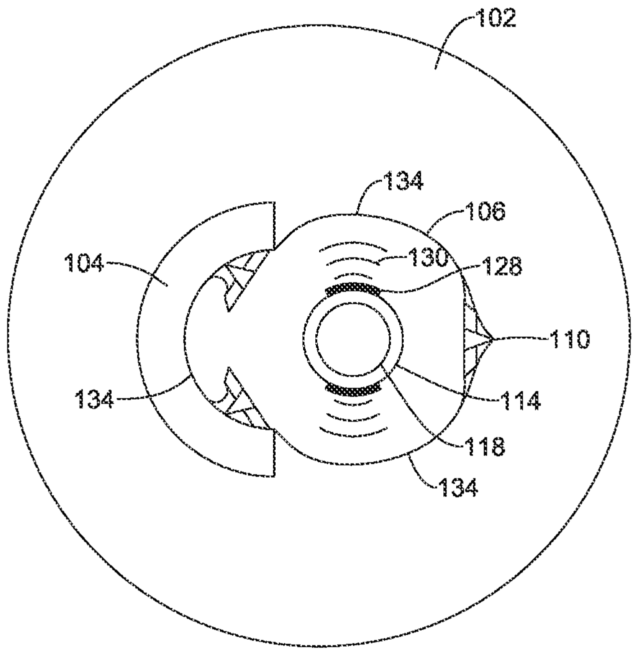
FIG. 4 is a transverse cross-sectional view of the illustrative balloon catheter of FIG. 3 inflated in a first configuration disposed in a blood vessel with an eccentric calcified lesion that restricts balloon inflation on the side with calcium and expands into the more compliant side of the vessel without calcium, the lithotripsy emitter is orientated away from the lesion calcium.

Referring additionally to FIG. 4 which illustrates a transverse cross-sectional view of the balloon 106, as the balloon 106 is expanded at the target region (e.g., adjacent to the lesion 104), the cutting members 110 deliver an amplified force to the lesion 104 generated by the balloon pressure to create controlled longitudinal cracks in the lesion. In some cases, the anchored cutting members 110 may supplement force at the point 134 of balloon contact which may be needed to propagate the fractures at lower pressures while reducing vessel trauma. In addition to the cutting members 110 penetrating the lesion 104, the ultrasound transducer 128 may be activated to generate an ultrasound field 130. It is contemplated that the ultrasound transducer 128 may be positioned such that the ultrasound field 130 aligns with the force amplification zones of the cutting members 110 and balloon 106 (e.g., the cutting members 110 and/or the point of balloon contact) to combine and focus two energy modalities on the same spot. For example, during assembly, the ultrasound transducer 128 may be positioned to align with at least one cutting member 110. When a lesion 104 is asymmetrical or extends around less than an entire circumference of the vessel 102, the portion of the vessel 102 that is free from the lesion 104 may be more compliant or may stretch more in response to the expansion of the balloon. It is contemplated that the anchoring effect of the cutting members 110 may also stabilize the compliant side of the vessel 102 which in turn may increase the effectiveness of the ultrasound field 130.

Figure 5:
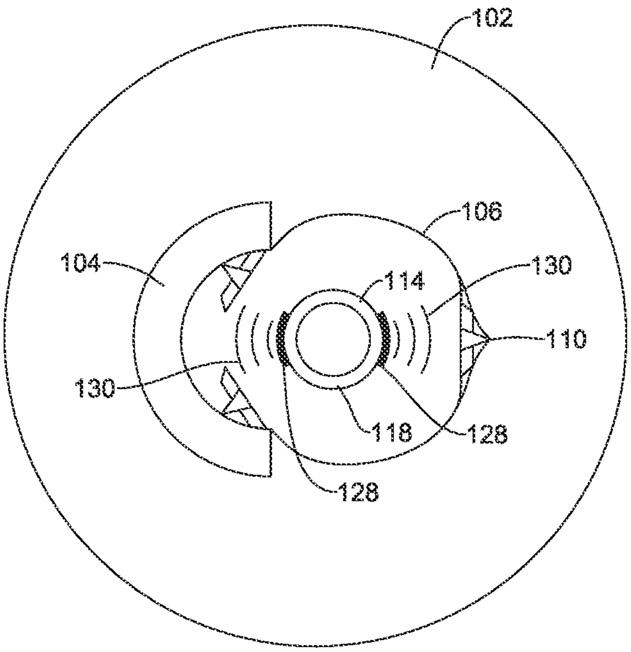
FIG. 5 is a transverse cross-sectional view of the illustrative balloon catheter of FIG. 3 in a second configuration disposed in a blood vessel, the lithotripsy emitter is orientated at the lesion calcium.

Once the balloon 106 is inflated to anchor into the vessel 102, the ultrasound transducer 128 may deliver the energy desired. In some cases, the original orientation of the ultrasound transducer 128, and thus the ultrasound field 130, may not align well with the lesion 104 to be disrupted, as shown in FIG. 4. Once the energy has been delivered, the emitter shaft 118 may be rotated and energy once again delivered to a different section of the circumference of the vessel 102, as shown in FIG. 5. It is contemplated that the emitter shaft 118 may be rotated incrementally until the optimal direction is achieved to crack the lesion 104. In some cases, the emitter shaft 118 may be rotated in increments of or less. A proximal end region of the emitter shaft 118 may include a marker or other visual indicia to indicate how much the emitter shaft 118 has been rotated relative to an initial orientation.

Figure 6:
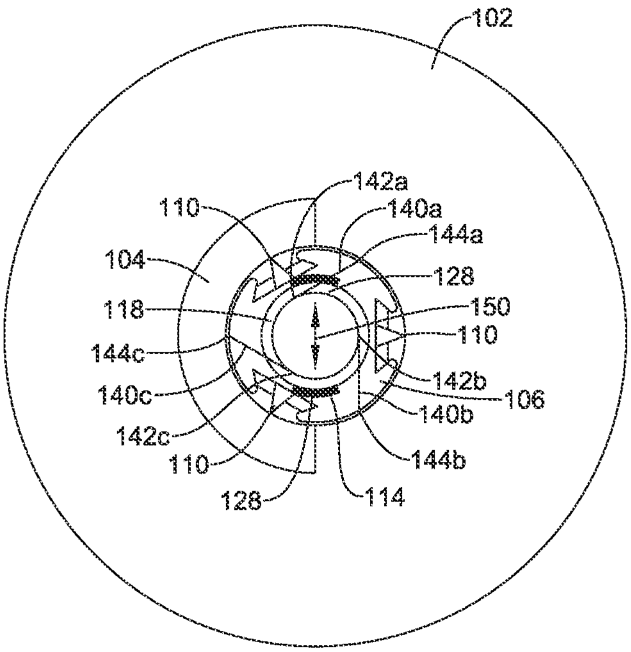
FIG. 6 is a transverse cross-sectional view of another illustrative an uninflated balloon catheter with self-orientating bands between the lithotripsy emitter and the balloon or elements in a first configuration disposed in a blood vessel with the lithotripsy emitter orientated away from the lesion calcium.
Figure 7:
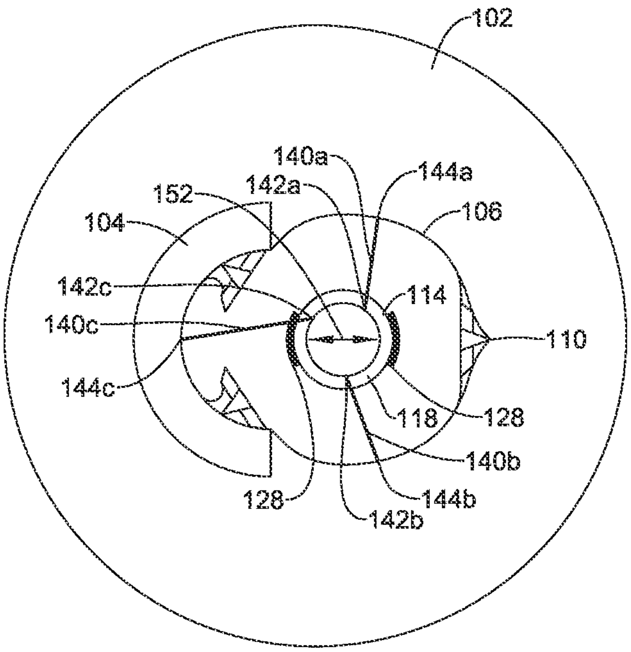
FIG. 7 is a transverse cross-sectional view of the balloon catheter of FIG. 6 inflated with the elements anchored into the vessel wall and the self-aligning bands rotating the emitter orientation towards the noncompliant lesion calcium and disposed in a blood vessel.

In some embodiments, the difference in vessel compliance due to an eccentric lesion 104 may cause the balloon 106 to expand unevenly. For example, the balloon 106 may have an inflated size and shape that varies with inflation pressure and the compliance of the vessel 102. In one example, the balloon 106 may expand more on the side opposite the non-compliant calcified lesion 104, as shown in FIGS. 4 and 5. It is contemplated that the uneven expansion of the balloon 106 may be leveraged to orientate the ultrasound transducer 128 towards the lesion 104. FIG. 6 is another transverse cross-sectional view of the balloon 106 in a collapsed or deflated and including additional features which automatically orientate the ultrasound transducer 128 towards the non-compliant lesion disposed within the vessel 102 having an eccentric lesion 104. The balloon 106 may further include a plurality of tethers 140*a*, 140*b*, 140*c* (collectively, 140) extending from a first end 142*a*, 142*b*, 142*c* (collectively, 142) coupled or secured to the emitter shaft 118 and a second end 144*a*, 144*b*, 144*c* (collectively, 144) coupled or secured to the balloon 106 or cutting members 110. FIG. 7 is transverse cross-sectional view of the balloon of FIG. 6 in an inflated configuration. The uneven dilation of the balloon 106 towards the compliant side of the vessel pulls on the tethers 140 on that side more than the tethers 140 on the non-compliant side (e.g., towards the lesion 104) automatically rotating or orientating the ultrasound transducer 128 towards the non-compliant calcified lesion 104.

In some embodiments, each tether 140 may be a string, a filament, or a plurality of strings or filaments woven or wound together. In other embodiments, the tethers 140 may be planar sheets of material having a length that extends generally parallel to a longitudinal axis of the emitter shaft 118 and a width extending between an outer surface of the emitter shaft 118 and an inner surface of the balloon 106. In yet other embodiments, the tethers 140 may be magnets or formed from a magnetic material. The tethers 140 may be formed from a material which resists stretching. The tethers 140 may be uniformly or eccentrically spaced about a circumference of the emitter shaft 118. In some cases, the tethers 140 may be positioned circumferentially between the cutting members 110, although this is not required. It is further contemplated that the tethers 140 may be positioned at a similar longitudinal location of the emitter shaft 118 or differing longitudinal locations, as desired. While three tethers 140 are illustrated, it is contemplated that there may be fewer than three or more than three tethers, as desired.

Referring now to FIG. 7, as the balloon 106 is inflated the balloon 106 may expand more on the side of the vessel 102 that is free from the lesion 104. As the balloon 106 inflates the second ends 144*a*, 144*b* of the first and second tethers 140*a*, 140*b* are drawn farther away from the emitter shaft 118 due to the vessel 102 being more compliant on the side opposite the lesions 104 and the balloon 106 expanding to a greater extent. As the second ends 144*a*, 144*b* are drawn radially away, the first and second tethers 140*a*, 140*b* cause the emitter shaft 118 to rotate. For example, in the deflated configuration shown in FIG. 6, the ultrasound transducer 128 is orientated to emit ultrasound energy 130 in a first orientation, away from the calcified lesion 104, as shown by arrow 150. As the balloon 106 is inflated, the tethers 140*a*, 140*b* on the non-calcific side of the balloon 106 are placed under more strain than the tether 140*c* on the calcific side of the balloon 106. The increased strain on the first and second tethers 140*a*, 140*b* causes the emitter shaft 118 to rotate such that the ultrasound transducer 128 is orientated to emit ultrasound energy 130 in a second orientation, towards the calcified lesion 104, as shown at arrow 152 in FIG. 7. The second orientation may direct the ultrasound energy 130 towards the lesion 104. Said differently, the tethers 140 may cause the ultrasound transducer 128 to self-align with the non-compliant target lesion 104 as the balloon 106 is inflated. It is further contemplated that the tethers 140 may stabilize the ultrasound transducer 128 within the balloon 106 for additional efficacy. In some cases, the cutting member 110 opposite the lesion 104 may reflect the ultrasound energy back towards the lesion 104 further improving efficacy. The cutting members 110 may act as anchors to stabilize the balloon 106 to facilitate the tether forces on the ultrasound transducer 128 thus enabling rotation.

Figure 8:
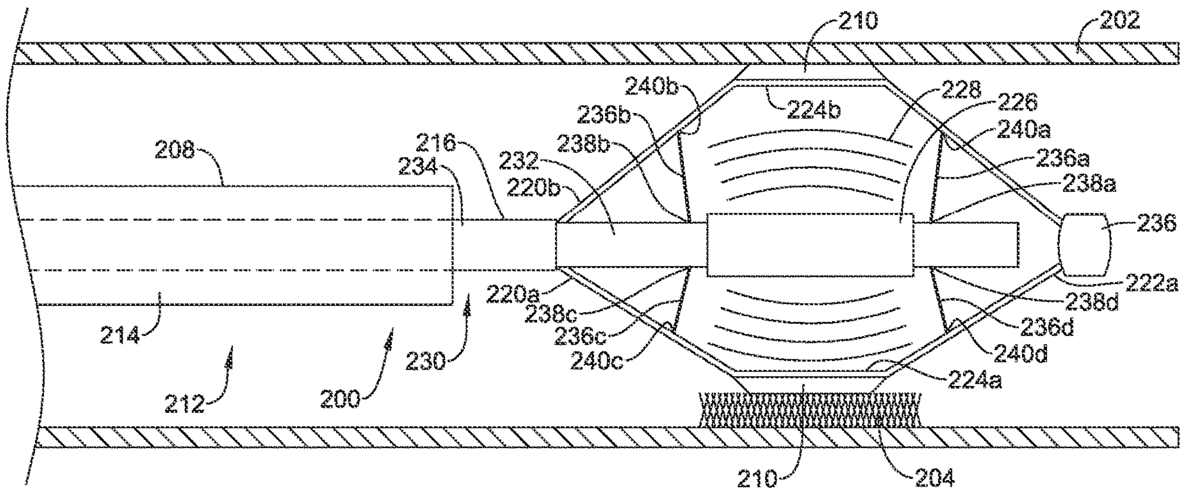
FIG. 8 is a side view of an expandable frame with self-orientating bands and cutting or scoring elements that anchor into the vessel wall and a lithotripsy emitter disposed in a blood vessel.

In some embodiments, an expandable metal or polymer frame may be used instead of an inflatable balloon to anchor, apply force on the lesion and non-uniformly expand in response to compliant differences in the vessel to self-align the emitter towards target tissue. FIG. 8 illustrates a side view of another illustrative catheter 200 that may be used to treat a lesion disposed in a blood vessel 202 and positioned adjacent to an intravascular lesion 204. The catheter 200 may be configured to cut or score the lesion 204 as well as emit a shockwave or ultrasound field. It is contemplated that a combination of ultrasound energy and cutting or scoring elements may cover a broader circumferential area than either alone. This may improve the efficacy of treatment, particularly in lesions having a low circumferential angle of calcification (e.g., the lesion extends less than an entire circumference of the vessel 202).

The catheter 200 may include an expandable basket 206 coupled to a catheter shaft 208. The shaft 208 may be an outer tubular member or a catheter shaft, similar to typical catheter shafts. For example, the catheter shaft 208 may be a tubular member extending from a distal end region 212 to a proximal end region (not explicitly shown) configured to remain outside of a patient's body. A lumen 214 may extend from the distal end region 212 to the proximal end region.

The catheter 200 may further include an inner tubular member 216, which may be slidably disposed within the lumen 214 of the catheter shaft 208. At least a portion of the expandable basket 206 may be coupled to a distal end region 230 of the elongate shaft 216. The catheter shaft 208 and inner tubular member 216 may be manufactured from a number of different materials. For example, the catheter shaft 208 and inner tubular member 216 may be made of metals, metal alloys, polymers, metal-polymer composites or any other suitable materials. An emitter shaft 232 may be disposed within a lumen 234 of the inner tubular member 216. While the emitter shaft 232 is shown in the lumen 234 of the inner tubular member, the emitter shaft 232 may alternatively be disposed within the lumen 214 of the elongate shaft 208. The emitter shaft 232 may be manufactured from a number of different materials. For example, the emitter shaft 232 may be made of metals, metal alloys, polymers, metal-polymer composites or any other suitable materials. In some cases, the emitter shaft 232 may be longitudinally translated and/or rotatable within the respective lumen 214, 234. In some embodiments, the emitter shaft 232 may include or be formed from a reinforcing member, such as, but not limited to, a coil or braid to enable torqueability.

The expandable basket 206 may be configured to transition between a collapsed configuration and an expanded configuration (FIG. 8). The expandable basket 206 may include a number of expandable positioning elements such as longitudinally extending struts 218*a*, 218*b* (collectively 218), which may be coupled to the inner tubular member 216 at their proximal ends 220*a*, 220*b* (collectively, 220). The distal ends 222*a*, 222*b* of the struts 218 may be coupled to a cap 236. In some instances, the cap 236 may include spacers which be used to maintain a consistent spacing between each of the struts 218. However, this is not required. In some cases, the struts 218 may be eccentrically arranged. The struts 218 may be configured to extend generally along the longitudinal axis of the catheter shaft 208. While the expandable basket 206 is illustrated as including two longitudinally extending struts 218, the expandable basket 206 may include any number of struts 218 desired, such as, but not limited to one, two, three, four, five, six, or more. Other suitable expandable positioning elements such as, but not limited to, rods or bars, a single hypotube having portions removed to form struts, an expandable stent (e.g., woven, braided, laser cut, etc.) having the proximal end and/or distal end gathered together, or the like may also be utilized.

The expandable basket 206 may be self-expandable or may require external force to expand from a collapsed state. Self-expandable members may be formed of any material or structure that is in a compressed state when force is applied and in an expanded state when force is released. Such members may be formed, for example, of shape memory alloys such as nitinol or any other self-expandable materials. When employing such shape-memory materials, the expandable basket 206 may be heat set in the expanded state and then compressed to fit within the catheter shaft 208 and/or inner tubular member 216, for example. In another embodiment, a spring may be provided to effect expansion. Alternatively, external forces such as, but not limited to, pneumatic methods, compressed fluid, pull wires, push wires, or the like may also be employed to expand the expandable basket 206. It is contemplated that nickel-titanium alloys may enable kink-resistant folding and self-expansion. In other examples, magnetic alloys, metals, metal alloys, polymers, composites, etc. may be used to form the expandable basket 206.

In other instances, a manual force applied to the inner tubular member 216 may manipulate or actuate the expandable basket 206 between the expanded and collapsed state. For example, actuation element may include a central wire that extends through the expandable basket 206. According to this embodiment, a pulling force exerted proximally on the wire may allow the struts 218 to expand and move the expandable basket 206 into an expanded state. A pushing force exerted distally on the wire may move elongate the struts 218 and/or otherwise shift the ablation device to a compressed or elongated state. Other actuation mechanisms may also be utilized.

As discussed above, the expandable basket 206 may include a number of expandable positioning elements such as longitudinally extending struts 218. The struts may each extend from a proximal end region 220 to a distal end region 222. An intermediate region 224*a*, 224*b* (collectively, 224) may be disposed between the proximal end regions 220 and the distal end regions 222. It is contemplated that in the expanded state, the intermediate regions 224 of the struts 218 may contact the vessel wall 202.

One or more cutting members or blades 210 may be mounted on or over the expandable basket 206. For example, the one or more cutting members 210 may be coupled to the intermediate regions 224 of the struts 218. The cutting members 210 may be cutting blades, as shown in FIG. 8 or scoring members (see, for example, FIG. 1B). In general, the catheter 200 may be advanced through the vasculature, to a target area with the expandable basket 206 in a collapsed configuration. Once positioned at the target location in the vasculature, the expandable basket 206 can be expanded to exert a radially outward force on the lesion 204 and one or more of the cutting members 210 may engage the lesion 204. Thus, the cutting members 210 may cut or score the lesion 204 to facilitate enlarging the lumen proximate the lesion 204. The target area may be within any suitable peripheral or cardiac vessel lumen location.

The emitter shaft 232 may include an ultrasound transducer or emitter 226. The ultrasound transducer 226 may be coupled to an outer surface of the emitter shaft 232 adjacent a distal portion thereof. During a procedure, emitter shaft 232 may be positioned such that the ultrasound transducer 226 is located within the basket 206 to generally align with the cutting members 210. For example, the emitter shaft 232 may be axially and rotatably movable with respect to the inner tubular member 216 In some cases, the ultrasound transducer 226 may include a piezoelectric material, which transmits acoustic pressure in response to an applied voltage. The ultrasound transducer 226 may be driven at one or more frequencies in the range of about 20 kilohertz (kHz) to about 50 megahertz (MHz). The ultrasound transducer 226 may be a single ultrasound transducer, or the ultrasound transducer 226 may include a series of ultrasound transducers that may be operated to effectively function as a single ultrasound transducer, providing the desired acoustic pressure over the desired treatment area. The acoustic pressure applied may range from tens of kiloPascals (kPa) to in excess of ten megaPascals (MPa).

The ultrasound transducer 226 may produce an ultrasound field 228 that includes a near field region and a far field region. In the near field region, dynamic acoustic pressures may be cyclically applied to the calcified lesion 204. As used herein, the near field region refers to a region in close proximity radially to a surface of the ultrasound transducer 226, for example, the region extending outward from the transducer surface to a radial distance less than or equal to a length of the ultrasound transducer 226, wherein the acoustic pressure waves transmitted by the ultrasound transducer 226 are unfocused and can be controlled to be substantially uniform upon the calcified lesion 204. The ultrasound transducer 226 may be configured to emit ultrasound waves in two opposing directions, or about 180° apart.

In some cases, for example, the ultrasound transducer 226 may be configured to impart a uniform or substantially uniform acoustic pressure along the length of the calcified lesion 204. In cardiac vessel disease states, vascular lesions may span a length of about 10 millimeters (mm) to about 25 mm in vessels that are about 2 mm to about 4 mm in diameter. In peripheral vessel disease states, vascular lesions may span a length of up to about 200 mm in vessels up to about 12 mm in diameter. Depending on the therapeutic applications, the ultrasound transducer 226 may be configured to impart a uniform or substantially uniform acoustic pressure over a length of about 10 mm to about 60 mm at a radial distance of about 1 mm to about 8 mm as measured from a central axis extending through the catheter shaft 208. While not explicitly shown, multiple ultrasound transducers 226 may be used and configured to extend the effective therapeutic length, such as up to a length of about 200 mm.

To impart a uniform or substantially uniform acoustic pressure in the near field, the ultrasound transducer 226 may have a length that is multiple times larger than a diameter of the emitter shaft 232, the inner tubular member 216 and/or the catheter shaft 208. In some cases, the ultrasound transducer 226 may have a length that is at least as long as a length of the calcified lesion 204, to generate a uniform or substantially uniform acoustic pressure over a length of about 20 to about 80 mm. In some instances, the ultrasound transducer 226, may be a single ultrasound transducer or a series of ultrasound transducers or transducer elements driven in such a way as to effectively act as a single ultrasound transducer. While not explicitly shown, the ultrasound transducer 226 may be electrically coupled to an electronic source via one or more wires. In some cases, two or more ultrasound transducers may be coupled to a single electronic source and driven with the same frequency and output. In other embodiments, two or more ultrasound transducers may be coupled to two or more differing electronic sources and driven independently of one another so that amplitude and phase control may be applied to increase the uniformity of the acoustic pressure imparted to the lesion 204.

As the expandable basket 206 is expanded at the target region (e.g., adjacent to the lesion 204), the cutting members 210 deliver an amplified force to the lesion 204 generated by the balloon pressure to create controlled longitudinal cracks in the lesion 204. In some cases, the anchored cutting members 210 may supplement force at the point of basket 206 contact, which may be needed to propagate the fractures at lower pressures while reducing vessel trauma. In addition to the cutting members 210 penetrating the lesion 204, the ultrasound transducer 226 may be activated to generate an ultrasound field 228. It is contemplated that the ultrasound transducer 226 may be positioned such that the ultrasound field 228 aligns with the force amplification zones of the cutting members 210 and expandable basket 206 (e.g., the cutting members 210 and/or the point of basket contact) to combine and focus two energy modalities on the same spot. For example, during insertion, the ultrasound transducer 226 may be positioned to align the generated ultrasound field 228 with at least one cutting member 210. When a lesion 204 is asymmetrical or extends around less than an entire circumference of the vessel 202, the portion of the vessel 202 that is free from the lesion 204 may be more compliant or may stretch more in response to the expansion of the basket. It is contemplated that the anchoring effect of the cutting members 210 may also stabilize the compliant side of the vessel 202 which in turn may increase the effectiveness of the ultrasound field 228.

In some embodiments, the expandable basket 206 may further include a plurality of tethers 236*a*, 236*b*, 236*c*, 236*d* (collectively, 236) extending from a first end 238*a*, 238*b*, 238*c*, 238*d* (collectively, 238) coupled or secured to the emitter shaft 232 and a second end 240*a*, 240*b*, 240*c*, 240*d* (collectively, 240) coupled or secured to the expandable basket 206 or cutting members 210. Generally, the uneven expansion of the expandable basket 206 towards the compliant side of the vessel pulls on the tethers 236 on that side more than the tethers 236 on the non-compliant side (e.g., towards the lesion 204) automatically rotating or orientating the ultrasound transducer 226 towards the non-compliant calcified lesion 204.

In some embodiments, each tether 236 may be a string, a filament, or a plurality of strings or filaments woven or wound together. In other embodiments, the tethers 236 may be planar sheets of material having a length that extends generally parallel to a longitudinal axis of the emitter shaft 232 and a width extending between an outer surface of the emitter shaft 232 and an inner surface of the expandable basket 206. In yet other embodiments, the tethers 236 may be magnets or formed from a magnetic material. The tethers 236 may be formed from a material which resists stretching. The tethers 236 may be uniformly or eccentrically spaced about a circumference of the emitter shaft 232. It is further contemplated that the tethers 236 may be positioned at a similar longitudinal location of the emitter shaft 232 or differing longitudinal locations, as desired. While four tethers 236 are illustrated, it is contemplated that there may be fewer than four or more than four tethers, as desired.

As the expandable basket 206 is expanded, the expandable basket 206 may expand more on the side of the vessel 202 that is free from the lesion 204. As the expandable basket 206 expands the second ends 240*a*, 240*b* of the first and second tethers 236*a*, 236*b* are drawn farther away from the emitter shaft 232 due to the vessel 202 being more compliant on the side opposite the lesions 204 and the expandable basket 206 expanding to a greater extent. As the second ends 240*a*, 240*b* are drawn radially away, the first and second tethers 236*a*, 236*b* cause the emitter shaft 232 to rotate. Said differently, as the expandable basket 206 is example, the tethers 236*a*, 236*b* on the non-calcific side of the expandable basket 206 are placed under more strain than the tethers 236*c*, 236*d* on the calcific side of the expandable basket 206. The increased strain on the first and second tethers 236*a*, 236*b* causes the emitter shaft 232 to rotate such that the ultrasound transducer 226 is orientated to emit ultrasound energy 228 in an orientation towards the calcified lesion 204. This may direct the ultrasound energy 228 towards the lesion 204. For example, the tethers 236 may cause the ultrasound transducer 226 to self-align with the non-compliant target lesion 204 as the expandable basket 206 is expanded. It is further contemplated that the tethers 236 may stabilize the ultrasound transducer 226 within the expandable basket 206 for additional efficacy. In some cases, the cutting member 210 opposite the lesion 204 may reflect the ultrasound energy back towards the lesion 204 further improving efficacy. The cutting members 210 may act as anchors to stabilize the expandable basket 206 to facilitate the tether forces on the ultrasound transducer 226 thus enabling rotation.

The materials that can be used for the various components of the system(s) and the various elements thereof disclosed herein may include those commonly associated with medical devices. For simplicity purposes, the following discussion refers to the system. However, this is not intended to limit the devices and methods described herein, as the discussion may be applied to other elements, members, components, or devices disclosed herein, such as, but not limited to, the catheter shaft, the inflatable balloon, the cutting members, the emitter shaft, etc., and/or elements or components thereof.

In some embodiments, the system, and/or components thereof, may be made from a metal, metal alloy, polymer (some examples of which are disclosed below), a metal-polymer composite, ceramics, combinations thereof, and the like, or other suitable material.

Some examples of suitable polymers may include polytetrafluoroethylene (PTFE), expanded polytetrafluoroethylene (ePTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), MARLEX® high-density polyethylene, MARLEX® low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS polycarbonates, polyurethane silicone copolymers (for example, ElastEon® from Aortech Biomaterials or ChronoSil® from AdvanSource Biomaterials), biocompatible polymers, other suitable materials, or mixtures, combinations, copolymers thereof, polymer/metal composites, and the like. In some embodiments components can be blended with a liquid crystal polymer (LCP). For example, the mixture can contain up to about 6 percent LCP.

Some examples of suitable metals and metal alloys include stainless steel, such as 304V, 304L, and 316LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R30035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R30003 such as ELGILOY®, PHYNOX®, and the like); platinum enriched stainless steel; titanium; platinum; palladium; gold; combinations thereof; or any other suitable material.

In at least some embodiments, portions or all of the system, and/or components thereof, may also be doped with, made of, or otherwise include a radiopaque material. Radiopaque materials are understood to be materials capable of producing a relatively bright image on a fluoroscopy screen or another imaging technique during a medical procedure. This relatively bright image aids the user of the system in determining its location. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the system to achieve the same result.

In some embodiments, a degree of Magnetic Resonance Imaging (MRI) compatibility is imparted into the system and/or other elements disclosed herein. For example, the system, and/or components or portions thereof, may be made of a material that does not substantially distort the image and create substantial artifacts (i.e., gaps in the image). Certain ferromagnetic materials, for example, may not be suitable because they may create artifacts in an MRI image. The system, or portions thereof, may also be made from a material that the MRI machine can image. Some materials that exhibit these characteristics include, for example, tungsten, cobalt-chromium-molybdenum alloys (e.g., UNS: R30003 such as ELGILOY®, PHYNOX®, and the like), nickel-cobalt-chromium-molybdenum alloys (e.g., UNS: R30035 such as MP35-N® and the like), nitinol, and the like, and others.

In some embodiments, the system and/or other elements disclosed herein may include and/or be treated with a suitable therapeutic agent. Some examples of suitable therapeutic agents may include anti-thrombogenic agents (such as heparin, heparin derivatives, urokinase, and PPack (dextrophenylalanine proline arginine chloromethylketone)); anti-proliferative agents (such as enoxaparin, angiopeptin, monoclonal antibodies capable of blocking smooth muscle cell proliferation, hirudin, and acetylsalicylic acid); anti-inflammatory agents (such as dexamethasone, prednisolone, corticosterone, budesonide, estrogen, sulfasalazine, and me s alamine); antineoplastic/antiproliferative/anti-mitotic agents (such as paclitaxel, 5-fluorouracil, cisplatin, vinblastine, vincristine, epothilones, endostatin, angiostatin and thymidine kinase inhibitors); anesthetic agents (such as lidocaine, bupivacaine, and ropivacaine); anti-coagulants (such as D-Phe-Pro-Arg chloromethyl keton, an RGD peptide-containing compound, heparin, anti-thrombin compounds, platelet receptor antagonists, anti-thrombin antibodies, anti-platelet receptor antibodies, aspirin, prostaglandin inhibitors, platelet inhibitors, and tick antiplatelet peptides); vascular cell growth promoters (such as growth factor inhibitors, growth factor receptor antagonists, transcriptional activators, and translational promoters); vascular cell growth inhibitors (such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin); cholesterol-lowering agents; vasodilating agents; and agents which interfere with endogenous vasoactive mechanisms.

It should be understood that this disclosure is, in many respects, only illustrative. Changes may be made in details, particularly in matters of shape, size, and arrangement of steps without exceeding the scope of the present disclosure. This may include, to the extent that it is appropriate, the use of any of the features of one example embodiment being used in other embodiments. The scope of the present disclosure is, of course, defined in the language in which the appended claims are expressed.

What is claimed is:

1. A catheter, comprising:

a catheter shaft;

an expandable member secured to a distal portion of the catheter shaft;

a cutting member secured to the expandable member; and an ultrasound transducer disposed within the expandable member and aligned longitudinally with the cutting member.

2. The catheter of claim 1, wherein the catheter shaft includes an inner tubular member defining a first lumen and an outer tubular member defining a second lumen.

3. The catheter of claim 2, wherein the ultrasound transducer is affixed to an outer surface of the inner tubular member.

4. The catheter of claim 1, wherein the ultrasound transducer is configured to impart a substantially uniform acoustic pressure wave along a length of a lesion.

5. The catheter of claim 1, wherein the cutting member is configured to score a lesion while the ultrasound transducer delivers acoustic pressure waves to the lesion.

6. A balloon catheter, comprising:

a catheter shaft;

an inflatable balloon secured to a distal portion of the catheter shaft;

a cutting member secured to the inflatable balloon;

an emitter shaft; and an ultrasound transducer disposed on the emitter shaft, aligned longitudinally with the cutting member and within the inflatable balloon.

7. The balloon catheter of claim 6, wherein the catheter shaft includes an inner tubular member defining a guidewire lumen and an outer tubular member defining an inflation lumen.

8. The balloon catheter of claim 7, wherein the emitter shaft is disposed within the guidewire lumen.

9. The balloon catheter of claim 7, wherein the emitter shaft is disposed within the inflation lumen.

10. The balloon catheter of claim 7, wherein the emitter shaft is rotatable relative to the catheter shaft.

11. The balloon catheter of claim 6, wherein the ultrasound transducer is configured to impart a substantially uniform acoustic pressure wave along a length of a lesion.

12. A catheter, comprising:

a catheter shaft;

an expandable member secured to a distal portion of the catheter shaft;

a plurality of cutting members secured to the expandable member;

an emitter shaft;

an ultrasound transducer disposed on the emitter shaft and within the expandable member; and a plurality of tethers each having a first end coupled to the emitter shaft and a second end coupled to the expandable member.

13. The catheter of claim 12, wherein each tether of the plurality of tethers comprises a filament.

14. The catheter of claim 12, wherein each tether of the plurality of tethers comprises a planar sheet of material.

15. The catheter of claim 12, wherein the plurality of tethers are configured to rotate the emitter shaft about a longitudinal axis of the emitter shaft as the expandable member is expanded.

16. The catheter of claim 15, wherein the plurality of tethers are configured to rotate the emitter shaft to orientate the ultrasound transducer towards a lesion.

17. The catheter of claim 12, wherein the plurality of tethers are uniformly distributed about a circumference of the emitter shaft.

18. The catheter of claim 12, wherein the plurality of tethers comprises three tethers.

19. The catheter of claim 12, wherein each tether of the plurality of tethers is circumferentially offset from the plurality of cutting members.

20. The catheter of claim 12, wherein at least one cutting member of the plurality of cutting members is configured to score a lesion while the ultrasound transducer delivers acoustic pressure waves to the lesion.

* * * * *